United States Patent
Bongart et al.

(10) Patent No.: US 7,311,739 B2
(45) Date of Patent: Dec. 25, 2007

(54) ALKOXYLATE AND ALCOHOL FREE FUEL ADDITIVES

(75) Inventors: Frank Bongart, Meerbusch (DE); William Dinsley Hodgson, Marlow (GB); Alan Rae, West Sussex (GB); Jurgen Roder, Dusseldorf (DE)

(73) Assignees: AAE Technologies International PLC, Dublin (IE); Cognis Deutschland GmbH and Co. KG, Dusseldorf (DE)

( * ) Notice: Subject to any disclaimer, the term of this patent is extended or adjusted under 35 U.S.C. 154(b) by 154 days.

(21) Appl. No.: 10/435,652

(22) Filed: May 8, 2003

(65) Prior Publication Data

US 2004/0040202 A1    Mar. 4, 2004

Related U.S. Application Data

(63) Continuation of application No. PCT/GB01/04934, filed on Nov. 8, 2001.

(30) Foreign Application Priority Data

Nov. 8, 2000    (GB) ................................ 0027274.0

(51) Int. Cl.
  *C10L 1/18*    (2006.01)
  *C10L 1/22*    (2006.01)
(52) U.S. Cl. .............................. 44/418; 44/451; 44/412
(58) Field of Classification Search .................. 44/418, 44/451, 412
  See application file for complete search history.

(56) References Cited

U.S. PATENT DOCUMENTS

| 2,456,569 | A |   | 12/1948 | Smith |
|---|---|---|---|---|
| 4,173,455 | A |   | 11/1979 | Fodor et al. |
| 4,204,481 | A | * | 5/1980  | Malec ........................ 123/1 A |
| 4,428,754 | A |   | 1/1984  | Smith |
| 4,729,769 | A | * | 3/1988  | Schlicht et al. ............... 44/418 |
| 5,891,203 | A | * | 4/1999  | Ball et al. ..................... 44/388 |
| 6,086,645 | A | * | 7/2000  | Quigley et al. ............... 44/418 |
| 7,208,022 | B2| * | 4/2007  | Corkwell et al. ............. 44/331 |

FOREIGN PATENT DOCUMENTS

| EP | 0 807 676 A2 | 11/1997 |
|---|---|---|
| EP | 0 936 265 A1 | 8/1999 |
| WO | WO-98/56878 A1 | 12/1998 |
| WO | WO-99/52996 A1 | 10/1999 |

* cited by examiner

*Primary Examiner*—Cephia D. Toomer
(74) *Attorney, Agent, or Firm*—Darby & Darby PC

(57) ABSTRACT

There is described a fuel composition which is substantially free of alkoxylated compounds and is substantially free of long-chain alkyl alcohols having at least 6 C atoms, and contains at least 95% by volume of a hydrocarbon-based fuel and 0.1 to 5% by volume of an additive of the formula (I); R—CO—NR$^1$R$^2$ (I) in which R is a saturated or unsaturated, linear or branched alkyl radical having 6 to 21 C atoms; and R$^1$ and R$^2$, which may be the same or different, each represent a hydroxyalkyl radical having 1 to 4 atoms.

26 Claims, 1 Drawing Sheet

Solubilising efficiency of Oleic diethanolamide c.f. prior art composition

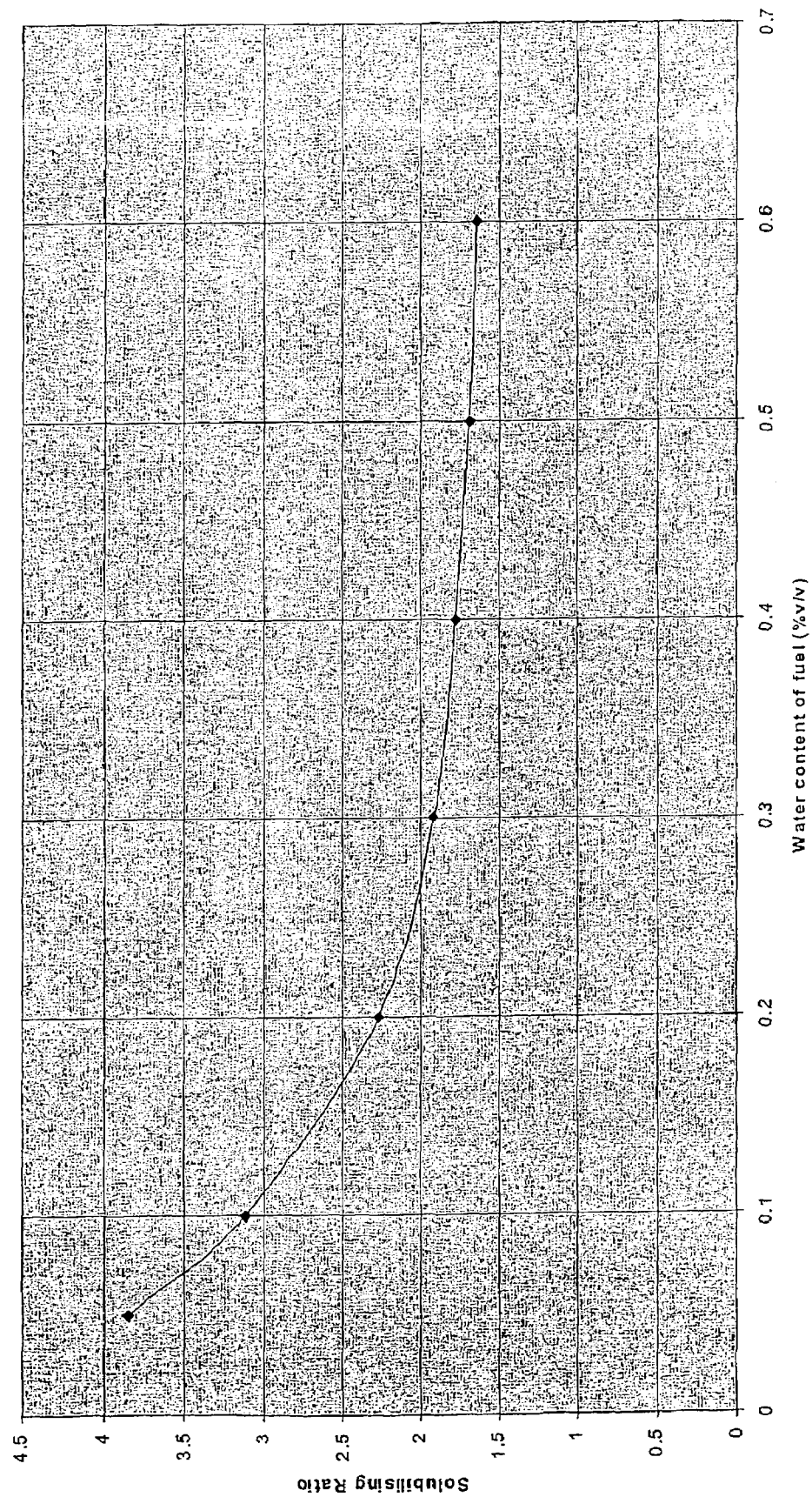

ALKOXYLATE AND ALCOHOL FREE FUEL ADDITIVES

This is a continuation of International Application No. PCT/GB01/04934 filed Nov. 8, 2001, and claims benefit of Great Britain Patent Application No. 0027274.0 filed Nov. 8, 2000. The International Application was published in English on May 16, 2002 as WO 02/38707 A2 under PCT Article 21 (2).

The present invention relates to diesel oil/alcohol mixtures which contain alkanolamides as additives.

The invention furthermore relates to a process for the preparation of diesel oil/alcohol mixtures and the use of selected individual components as solubilisers for alcohol-containing diesel fuel.

The use of surfactants as additives for fuels has long been known. Thus, for example, British Patent GB 2 21 72 29 describes an additive which contains 48 parts by volume of an ethoxylated alcohol, 3 to 8 parts of lauric acid diethanolamide, 3 to 8 parts of oleic acid diethanolamide and 1.5 to 4 parts of an ethoxylated oleic acid. Such compositions are suitable as additives which permit the dissolution of water in fuel and thus reduce the corrosion. However, problems arise when, instead of the water, for example short-chain alcohols are to be used as the mixed phase with the fuels. For this purpose, WO 98/17745 describes an alternative composition which contains 25% by volume of diethanolamide, 50% by volume of an ethoxylated alcohol and 25% by volume of a $C_{14}$ fatty acid ethoxylated with 7 mol. The additive is used for improving the solubility of alcohol in ethanol, which in the end results in the reduction in the emissions of $CO_2$ and CO and $NO_x$.

As in the past, the disadvantage is that a large number of individual substances has to be used to achieve the desired effect. As in the past, there is a need for achieving dissolution of ethanol in fuel, preferably in diesel, by using economical additives which are as simple as possible, in order to achieve in this way a noticeable reduction in gaseous reaction products, in particular $NO_x$ and CO or $CO_2$ resulting from combustion of the fuel.

It is an object of the present application to solve the problems described above.

Surprisingly, it has now been found that sufficient dissolution of ethanol in fuels, preferably in diesel oil, can be achieved by using selected individual components.

According to a first aspect of the present invention we provide a fuel composition which is substantially free of alkoxylated compounds and is substantially free of long-chain alkyl alcohols having at least 6 C atoms, and contains at least 95% by volume of a hydrocarbon-based fuel and 0.1 to 5% by volume of an additive of the formula (I);

$$R—CO—NR^1R^2 \qquad (I)$$

in which R is a saturated or unsaturated, linear or branched allyl radical having 6 to 21 C atoms; and $R^1$ and $R^2$, which may be the same or different, each represent a hydroxyalkyl radical having 1 to 4 C atoms.

In the context of this application, fuels are understood as meaning all energy-supplying operating materials whose free combustion energy is converted into mechanical work. These include all types of motor and aviation fuels which are liquid at room temperature and atmospheric pressure. Motor fuels, for example for car or lorry engines, contain as a rule hydrocarbons, e.g. petrol fractions or higher-boiling mineral oil fractions. Diesel fuels are obtained from gas oil by cracking or from tars which are obtained in the low-temperature carbonisation of lignite or hard coal. Customary products have a density between 0.83 and 0.88 g/cm³, a boiling point between 170 and 360° C. and flashpoints between 70 and 100° C. Preferably, the fuels according to the invention contain diesel oil or consist of diesel oil. They also include the so-called biodiesel, i.e. a fatty acid methyl ester, preferably the methyl ester of rape seed oil fatty acid.

The fuels according to the invention are distinguished by the fact that they contain only a single component selected from the compounds of the formula (I) and that consequently no expensive and complicated mixtures of different individual substances are required. Particular exceptions are the alkoxylated compounds and long-chain alkyl alcohols known from the prior art, such as WO 98/17745 cited above.

The additive component is preferably chosen so that its HLB value is less than 12. The value is calculated as follows:

HLB=Molecular volume of the hydrophilic chain× 20/total molecular volume.

In a further aspect of the invention, the fuel composition as hereinbefore described may comprise a hydrocarbon-based fuel which includes an amount of an oxygenator, e.g. alcohol or alcohols. Such alcohols are preferentially C1 to C6 alkanols, such as propanol, butanol or ethanol, and isomers thereof. The most preferred alcohol is ethanol. In such a composition the alcohol may be present in an amount of from 1 to 10% by volume of the composition.

The fuel compositions according to the invention are prepared by mixing the fuel additive with a fuel/ethanol mixture. Preferred fuel compositions are those in which the volume ratio (v/v) of fuel, e.g. petroleum diesel to additive is in the range of 1000:0.5 to 1000:50, and preferably of 1000:1 to 1000:50.

A preferred embodiment of the invention is a fuel composition consisting of 88 to 98.9% by volume of diesel oil, 1 to 10% by volume of alcohol, e.g. ethanol, and 0.1 to 2% by volume of the additive according to the above description.

The use of the additives according to the invention makes it possible to prepare mixtures of fuels with alcohol, e.g. ethanol, preferably petroleum diesel with ethanol, in an economical manner. Preferably, a maximum of 0.5 to 2.0% by volume of additive are added to the diesel oil/ethanol mixture. Water may also be present. It is particularly preferable to use substantially anhydrous ethanol which preferably contains less than 0.5% by volume of water. Furthermore, the total fuel composition is preferably anhydrous, i.e. the water content should be less than 0.2% volume, preferably less than 0.1% by volume.

A further aspect of the present invention relates to a fuel composition consisting of 90 to 98.5% by volume of diesel oil, 1 to 8% by volume of alcohol, e.g. ethanol and 0.5 to 2% by volume of an additive of formula I.

For fuels, ethanol may be produced from fossil fuel feedstocks or by fermentation of sugars derived from grains or other biomass materials. Therefore, ethanol suitable for use in accordance with the fuel compositions of the invention may be fuel grade ethanol derived from yeast or bacterial fermentation of starch-based sugars. Such starch-based sugars may be extracted from corn, sugarcane, tapioca and sugar beet. Alternatively, fuel grade ethanol may be produced via known dilute and/or concentrated acid and/or enzymatic hydrolysis of a particular biomass material, for example, from waste industrial sources include, cellulosic portions of municipal solid waster, waste paper, paper sludge, saw dust. Biomass may also be collected from agricultural residues included, for example, rise husks and paper-mill sludge.

A suitable fuel grade ethanol for use in accordance with the invention may contain none or only contaminant levels of water. It should be noted that fuels containing, e.g. ethanol, may contain trace amounts of water. Thus, for example, anhydrous ethanol will generally contain up to 0.5% w/w of water. Therefore, hereinafter reference to an anhydrous fuel composition should be understood be a composition which is substantially free of water, but may contain, for example, up to 0.5% w/w of water. Alternatively, a suitable fuel grade ethanol for use in accordance with the invention may contain higher amounts of water, up to 5% w/w (hydrous ethanol).

Use of ethanol in combination with a diesel fuel has previously posed problems wherein the ethanol/diesel fuel mixture would undesirably separate into two distinct phases, especially when water is present, and render the resultant mixture unsuitable for use as a combustible fuel. The use of the fuel additives of the invention permits hydrous ethanol to be blended satisfactorily with conventional diesel fuel without forming two phases. The use of fuel grade ethanol blended in accordance with the invention imparts desirable combustion characteristics to the overall fuel composition; such as improved fuel stability, lower smoke and particular matter, lower CO and NOx emissions, improved antiknock characteristics, and/or improved anti-freeze characteristics.

The presence of the additive of the invention ensures that the fuel composition forms a consistent stable homogenous composition and creates a monolayer simultaneously a result of which leads to a better more complete burn which reduced pollution and increases miles per gallon.

As a result of a blended fuel, particularly alcohol based, is able to combust more precisely with a cooler charge to reduce the iron-formates present from the aldehyde peracids and peroxide reactions normally attributable to engine degradation.

We further provide a method of running an internal combustion engine comprising the use of a fuel composition of the invention.

It is particularly preferable to use substantially anhydrous ethanol which preferably contains less than 0.5% by volume of water. Furthermore, the total fuel composition is preferably anhydrous, i.e. the water content should be less than 0.2% by volume, preferably less than 0.1% by volume.

International Patent Application No. WO99/35215, Wenzel, describes an additive for combustible fuels which includes a nitrogen source, such as urea. Whilst the additive is said to reduce NOx, the compositions are very complex and include numerous ingredients, including:

a water soluble alcohol,
a C6 to C12 alcohol
a C6 to C18 ethoxylated alcohol
a C10 to C24 fatty acid, and
a nitrogen source.

We have now surprisingly found that the fuel composition of the invention can comprise very low fuel: additive ratios in combination with nitrogenous compounds such as urea.

Thus according to the invention we provide a fuel composition as hereinbefore described and a nitrogen source.

The nitrogen compound may be selected from the group consisting of ammonia, hydrazine, alkyl hydrazine, dialkyl hydrazine, urea, ethanolamine, monoalkyl ethanolamine, and dialkyl ethanolamine wherein alkyl is independently selected from methyl, ethyl, n-propyl or isopropyl. Urea is preferred. The nitrogen compound may be an anhydrous compound or a hydrous compound, e.g. an aqueous solution, and may be up to a 5% w/w aqueous solution.

According to a yet further feature of the invention we provide a method of solubilising a nitrogen compound in a fuel composition which comprises mixing a hydrocarbon fuel composition as hereinbefore described and a nitrogen compound. The method of the invention may optionally include the addition of water, as hereinbefore described.

We also provide the use of a nitrogen compound in the manufacture of a fuel composition of this aspect of the invention. We especially provide the use of urea in the manufacture of fuel composition of the invention.

In the fuel composition in this aspect of the invention the nitrogen compound may be added by being incorporated into the fuel additive or may be added separately. Furthermore, the nitrogen compound may be added as an aqueous solution.

The fuel composition of the invention may also optionally comprise a cetane booster in amount of from 0.1% v/v to 1.0% v/v, based on the volume of the mixture. When a cetane booster is included in the fuel composition of the invention it may be added as part of the fuel additive of the invention or it may be added separately.

A suitable cetane booster for use in the mixture is selected from the group comprising, 2-ethylhexyl nitrate, tertiary butyl peroxide, diethylene glycol methyl ether, cyclohexanol, and mixtures thereof. The amount of cetane booster present in the mixture is a function of the cetane value of the particular diesel fuel and the amount of ethanol present in the particular fuel composition. Generally, the lower the diesel fuel cetane value, the higher the amount of the cetane booster, similarly, because ethanol typically acts as a cetane depressant, the higher the concentration of ethanol in the solution, the more cetane booster may be necessary in the mixture.

The fuel additives of the invention are advantageous in that, inter alia, they are more efficient at producing micro emulsions than prior art additives. Therefore, they are capable of more efficiently producing a stable, clear and homogenous solution with a hydrocarbon fuel, e.g. diesel/ethanol, even in the presence of water. Therefore, according to a further feature of the invention we provide a fuel composition as hereinbefore described, which optionally includes an amount of water, and wherein the fuel consists of a substantially stable, clear and substantially homogeneous solution.

Furthermore, the fuel additive or the fuel composition of the invention may also optionally include a demulsifier in an amount of less than 5% v/v and preferably less than 1% v/v based on the volume of the mixture.

The effect of the additives is to be understood in the sense that they have a solubilising effect. Accordingly, the use of the fuel additive as a solubiliser for ethanol-containing diesel fuels is also claimed.

According to a yet further aspect of the invention we provide the use of a compound of formula I in the manufacture of a fuel composition as hereinbefore described.

According to another aspect of the invention the fuel composition as hereinbefore described comprises a diesel oil a substantial portion of which is a biodiesel.

The compounds of the formula (I) are acid amides which can be obtained by known reactions between hydroxyalkylamines and carboxylic acids. Such alkanolamides and their properties are described, for example, in Handbook of Surfactants, M. R. Porter, Chapman and Hall, 1991, on pages 135 to 139. The disclosure of the cited publication is also part of the present application. As a result of the synthesis, it is usual for by-products, preferably free hydroxyamine, to be present, in addition to the compounds of the formula (I), in the products used commercially. In the teaching according to the invention, up to 5% by volume, measured according to DGF H-VI 4b, of free amines, based on the amount of additive, may be present. Furthermore, small amounts of free fatty acids may be present in the additives as a result of the production. Their amount, measured according to DGF H-VI 4a, is not more than 1% by volume, based on the additive. Compounds of the formula (I) are sold by the applicant under the trade name Comperlan®.

Those compounds of the formula (I) in which the radicals $R^1$ and $R^2$ are the same and represent hydroxyalkyl radicals, preferably ethyl radicals are particularly preferred. Furthermore, it is advantageous if the radical R has 11 to 21 C atoms. The use of oleic acid diethanolamides (R then corresponds to a monounsaturated alkyl radical having 17 C atoms) as an additive is particularly preferred. The compounds of the formula (I) can be used in pure form or as a mixture of different isomers. The latter is usual in the industrial grades preferably to be used. Here, for example, isomer mixtures which contain an excess of oleic acid diethanolamide and further of the formula (I) in which $R^1$ and $R^2$ each represents an hydroxyalkyl radical and R represents an alkyl radical having 11 to 13 C atoms are present.

The effect of the additives is to be understood in the sense that they have a solubilising effect. Accordingly, the use of the compounds according to formula (I) as solubilisers for ethanol-containing diesel fuels is also claimed.

Thus we further provide the use of a compound of formula I in the manufacture of a fuel composition as hereinbefore described.

The invention will now be described by way of example only

EXAMPLE 1

The effect of the additives according to the invention was tested by the cold filter plugging point test (CFPP) according to EN 116: 1997.

According to the test method, the additive-containing fuel was cooled stepwise to −30° C. for this purpose, in each case a sample being taken at 1° C. temperature intervals and being sucked through a standardised filter means at reduced pressure of 2 kPa. The stated temperature value then corresponds to the temperature at which the fuel can no longer flow through the filter means in a specified time. For the compounds according to the invention, the blends of ethanol and diesel they stabilise have CFPP values similar to diesel without additives.

EXAMPLE 2

A comparison was made of the solubilising efficiency of oleic acid diethanolamide and an additive whose composition was of the prior art, when used to stabilise a fuel blend of hydrous ethanol (7.7% v/v) with diesel (92.3% v/v).

The prior art additive contained 25% v/v diethanolamide, 50% v/v ethoxylated alcohol and 25% v/v C14 fatty acid ethoxylated with 7 moles EO. Experimentally, ethanol/diesel blends were made up containing water contents up to 0.6% v/v and the amount of additive required to produce clear, stable solutions determined volumetrically.

The solubilising ratio, i.e. the volume of the prior art additive divided by the volume of the additive of the invention, was plotted against water content (see FIG. 1).

The results confirm that the alkanolamide is considerably more effective especially at low water concentrations.

The invention claimed is:

1. A fuel composition which (i) is substantially free of alkoxylated compounds; and (ii) is substantially free of long-chain alkyl alcohols having at least 6 C atoms; and (iii) contains at least 95% by volume of a hydrocarbon-based fuel comprising a diesel oil and 0.1 to 5% by volume of an additive of the formula (I):

$$R-CO-NR^1R^2$$

wherein R is a saturated or unsaturated, linear or branched alkyl radical having 6 to 21 C atoms; and $R^1$ and $R^2$, which may be the same or different, are each a hydroxyalkyl radical having 1 to 4 C atoms; wherein the hydrocarbon-based fuel comprises as an oxygenator, ethanol, wherein the ethanol contains no more than 0.5% water, and wherein the total fuel composition contains less than about 0.2% water by volume.

2. A fuel composition according to claim 1 wherein the ethanol is present in an amount of from 1 to 10% by volume.

3. A fuel composition according to claim 1 wherein $R^1$ and $R^2$ are the same.

4. A fuel composition according to claim 3 wherein the radicals $R^1$ and $R^2$ are the same and each is hydroxyethyl.

5. A fuel composition according to claim 1 wherein the radical R has 11 to 21 C atoms.

6. A fuel composition according to claim 1 wherein the compound of formula I is an oleic acid diethanolamide.

7. A fuel composition according to claim 1 wherein the additive has an HLB value of less than 12.

8. A fuel composition according to claim 1 wherein the volume ratio (v/v) of fuel to additive is in the range of 1000:0.5 to 1000:50.

9. A fuel composition according to claim 1 wherein the volume ratio (v/v) of fuel to additive is in the range 1000:1 to 1000:50.

10. A fuel composition according to claim 1 wherein the fuel composition consists of 85 to 98.9% by volume of diesel oil, ito 10% by volume of aleehel ethanol and 0.1 to 5% by volume of an additive of formula I.

11. A fuel composition according to claim 1 wherein the fuel composition consists of 89 to 94.5% by volume of diesel oil, 5 to 8% by volume of ethanol and 0.5 to 3% by volume of additive.

12. A fuel composition according to claim 1 wherein the diesel oil comprises a petroleum diesel.

13. A fuel composition according to claim 1 wherein a proportion of the diesel oil is a biodiesel.

14. A fuel composition according to claim 1 wherein the total fuel composition is substantially anhydrous.

15. A fuel composition according to claim 1 wherein the composition further comprises an additional nitrogen compound.

16. A fuel composition according to claim 15 wherein the nitrogen compound is selected from the group consisting of ammonia, hydrazine, alkyl hydrazine, dialkyl hydrazine, urea, ethanolamine, monoalkyl ethanolamine, and dialkyl ethanolamine wherein alkyl is independently selected from methyl, ethyl, n-propyl or isopropyl.

17. A method of solubilising a nitrogen source in a fuel composition which comprises mixing a hydrocarbon fuel composition according to claim 1 and a nitrogen source.

18. A fuel composition according to claim 1 wherein the composition also comprises a cetane booster in amount of from 0.1% v/v to 1.0% v/v, based on the volume of the composition.

19. A fuel composition according to claim 18 wherein the cetane booster is selected from the group consisting of 2-ethyihexyl nitrate, tertiary butyl peroxide, diethylene glycol methyl ether, cyclohexanol, and mixtures thereof.

20. A fuel composition according to claim 1 wherein the fuel consists of a substantially stable, clear and substantially homogeneous solution.

21. A fuel composition according to claim 1 wherein the composition comprises a demulsifier in an amount of less than 5% v/v.

22. A process for the preparation of a fuel composition according to claim 1, which comprises mixing the additive in an amount of from 0.1 to 5% by volume with diesel oil and splash blending the mixture into a clear, stable fuel.

23. A process for the preparation of a fuel composition according to claim 1, which comprises (i) dissolving the additive in an amount of from 0.1 to 5% by volume in ethanol to produce an additive solution; and (ii) splash blending the solution with a hydrocarbon fuel.

24. A method of running an internal combustion engine comprising the use of a fuel composition according to claim 1.

25. The fuel composition of claim 1 comprising from about 1 to about 10% by volume of ethanol.

26. A fuel composition which (i) is substantially free of alkoxylated compounds; and (ii) is substantially free of long-chain alkyl alcohols having at least 6 C atoms; and
(iii) contains at least 95% by volume of a hydrocarbon-based fuel comprising a diesel oil and 0.1 to 5% by volume of an additive of the formula (I):

$$R—CO—NR^1R^2$$

wherein R is a saturated or unsaturated, linear or branched alkyl radical having 6 to 21 C atoms; and
$R^1$ and $R^2$, which may be the same or different, are each a hydroxyalkyl radical having 1 to 4 C atoms; wherein
the hydrocarbon-based fuel comprises as an oxygenator, ethanol,
wherein the ethanol contains no more than 0.5% water, and
wherein the total fuel composition contains less than about 0.5% water by weight.

* * * * *